United States Patent [19]

Dyke

[11] Patent Number: 5,172,594
[45] Date of Patent: Dec. 22, 1992

[54] EXTERNALLY REMOVABLE LIQUID LEVEL SENSOR SYSTEM

[75] Inventor: John Dyke, Federal Way, Wash.

[73] Assignee: The Boeing Company, Seattle, Wash.

[21] Appl. No.: 784,192

[22] Filed: Oct. 29, 1991

[51] Int. Cl.⁵ .............................................. G01F 23/00
[52] U.S. Cl. ................................. 73/290 V; 73/290 R; 73/304 R
[58] Field of Search ................ 73/290 R, 290 V, 294, 73/298, 299, 304 R, 571, 627, 584; 367/908; 374/208

[56] References Cited

U.S. PATENT DOCUMENTS

| | | | |
|---|---|---|---|
| 1,675,210 | 6/1928 | Campbell et al. | 374/208 |
| 2,525,361 | 10/1950 | Lamb | 374/208 |
| 3,025,703 | 3/1962 | LaRue | 73/298 |
| 3,495,915 | 2/1970 | Watson et al. | |
| 3,656,134 | 4/1972 | Brown | |
| 3,788,143 | 1/1974 | Gabriel | |
| 4,051,726 | 10/1977 | Hastbacka | 73/290 R |
| 4,063,457 | 12/1977 | Zekulin et al. | |
| 4,132,144 | 1/1979 | Shah et al. | |
| 4,157,036 | 6/1979 | Kivenson | 73/290 R |
| 4,213,337 | 7/1980 | Langdom | 73/290 V |
| 4,594,891 | 6/1986 | Benz et al. | 73/290 V |
| 4,730,979 | 3/1988 | Hook, Jr. | |
| 4,751,845 | 6/1988 | Peterson et al. | 73/298 |
| 4,811,601 | 3/1989 | Tolan | 73/290 V |

OTHER PUBLICATIONS

Oil and Gas Journal, vol. 54, No. 39, pp. 275, 278, Jan. 30, 1956.

Primary Examiner—William A. Cuchlinski, Jr.
Assistant Examiner—G. Bradley Bennett
Attorney, Agent, or Firm—R. H. Sproule

[57] ABSTRACT

A liquid level sensor system for a tank includes a stillwell having a transducer assembly positioned in the bottom of the stillwell. A guide conduit surrounds a flexible plastic coated wire bus which extends through a sidewall of the tank and which connects the transducer assembly to an indicator assembly located outside the tank. The conduit includes an end cap which secures the wire bus within the conduit. Installation and removal of the transducer assembly and wire bus is accomplished at a location outside the tank by removing the end cap and pulling or pushing the transducer assembly through the conduit by means of the wire bus.

7 Claims, 2 Drawing Sheets

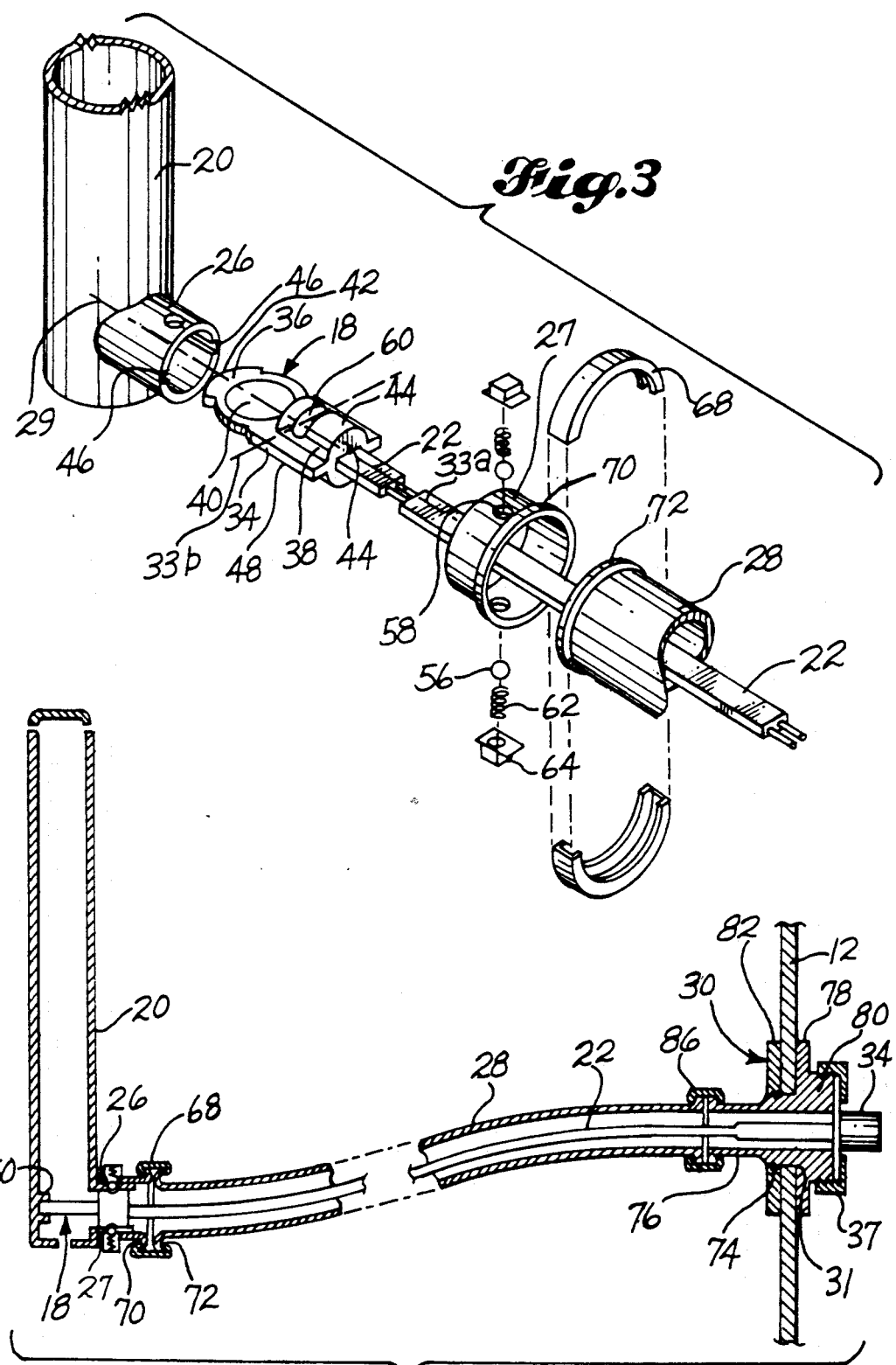

EXTERNALLY REMOVABLE LIQUID LEVEL SENSOR SYSTEM

TECHNICAL FIELD

The present invention pertains to device for determining the level of liquid inside a container.

BACKGROUND OF THE INVENTION

Some liquid storage tanks have an electronic sensor for determining the level of liquid inside the tank. The sensor, located inside the tank, is connected by a wire harness to an indicator gauge located outside the tank. In order to repair or replace the sensor, it is necessary for personnel to remove the necessary access doors and to enter the tank. Prior to entry, the tank must be emptied and ventilated when toxic fumes are present. In some cases preparing the tank for entry can take up to several days. Sometimes, the time required to prepare the tank for entry often exceeds the time required to enter and repair the defective part.

It is desirable therefore to provide a tank liquid level sensing system wherein the sensor can be be removed from the tank without the need for personnel entry into the tank.

A number of conventional quantity sensing systems have been disclosed. For example, U.S. Pat. No. 3,495,915 by Watson et al discloses a removable device for detecting and measuring the size of passages located inside component parts such as turbine blades.

In addition, U.S. Pat. No. 3,656,134 to Brown discloses a liquid level sensor which includes a probe which is movably mounted within a sheath, the sheath including a plurality of guide surfaces for insuring accurate alignment of the probe within the sheath.

SUMMARY OF THE INVENTION

The present invention pertains to level sensor system for a liquid holding tank. The system includes a stillwell and a transducer assembly, positioned inside the stillwell, for generating a signal which is a function of the level of liquid inside the tank. The transducer assembly includes at least one positioning spline. The system also includes a wire assembly for conducting the signal from the transducer assembly to an indicator located outside the tank. The wire assembly includes at least one wire which extends through a wall of the tank. Also included in the system is a sleeve, extending from the stillwell, for receiving the transducer assembly therein. The sleeve has at least one slot for receiving the transducer assembly spline therein so as to position the transducer in a selected manner inside the sleeve and stillwell. In addition, there is a conduit which is connected with the sleeve and a wall of the tank for guiding the transducer to the sleeve. An end cap is attached to the conduit at a location outside the tank. The end cap is removable from the conduit to permit installation and removal of the wire assembly and transducer assembly through the conduit.

An advantage of the present invention is that the sensor can be installed and removed from a liquid holding tank without the need for personnel to enter the tank.

Another advantage of the present invention is that the sensor is automatically aligned and positioned for proper operation within the tank.

BRIEF DESCRIPTION OF THE DRAWINGS

The present invention will be discussed in greater detail in the following detailed description, wherein:

FIG. 3 is an exploded view of transducer assembly portion of the liquid level sensor system; and FIG. 4 is a side sectional view of the liquid level sensor system.

DETAILED DESCRIPTION

Figure 1:
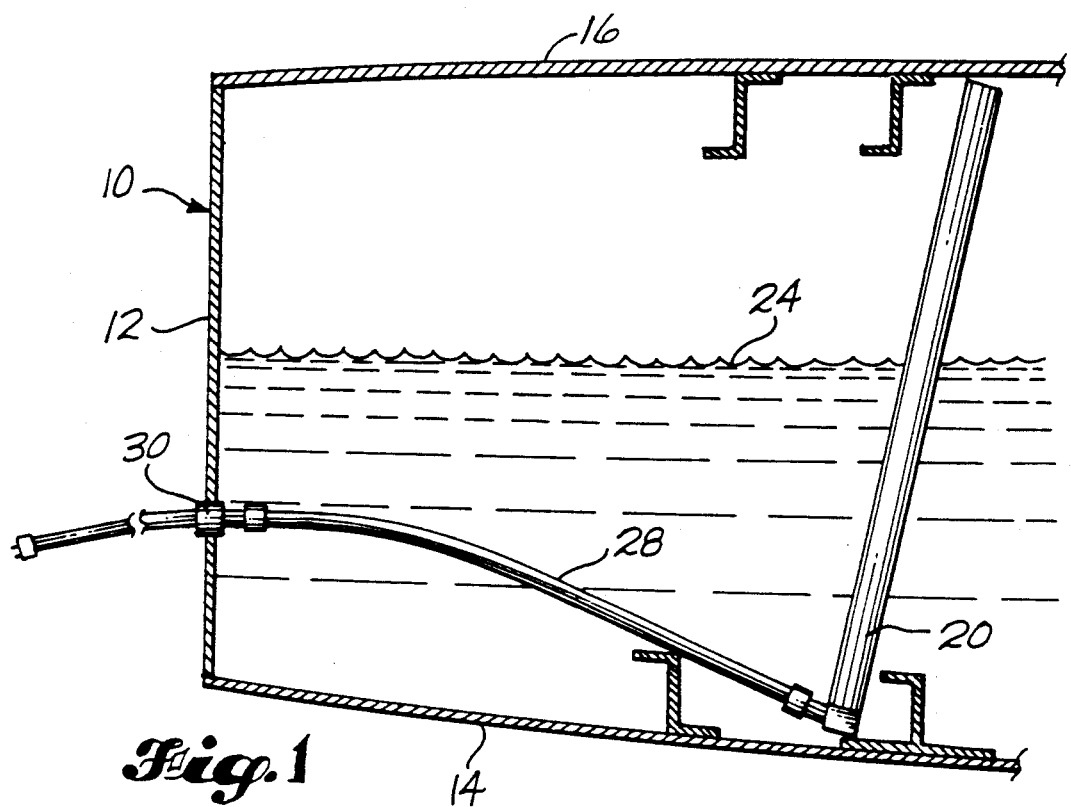
FIG. 1 is a side view of a conventional liquid storage tank having installed therein the liquid level sensor system of the present invention.

In order to briefly describe the present invention, reference is made to FIG. 1 where there is shown a portion of a liquid storage tank indicated at 10 which includes vertical sidewalls 12 (only one of which is shown), a floor 14, and a top 16. In order to determine the height of liquid inside the tank, a conventional ultrasonic transducer assembly indicated at 18 (FIG. 3) is mounted in the bottom of a conventional stillwell 20. The transducer assembly 18 is connected by means of a wire bus 22 to a conventional fuel quantity indicator system (not shown) located outside of the tank. The transducer operates in a conventional manner by emitting a signal upward within the stillwell 20 (FIG. 1). The signal is reflected from the top surface of the liquid back downward to the transducer. A conventional fuel quantity processor in the indicator system measures the time for the signal to travel up to and back from the surface of the liquid and calculates (in a conventional manner) the amount of fuel in the tank by using stored values contained in the processor's memory.

As shown in FIGS. 1 and 3, the stillwell 20 is a cylindrical tube mounted in a generally upright manner inside the tank. The stillwell includes a number of holes along its length (not shown) which allow the liquid to enter the stillwell tube and to fill the tube to the level of liquid inside the tank. The stillwell 20 aids in achieving more accurate liquid quantity measurements by concentrating the signals emitted and received by the transducer.

As shown more clearly in FIG. 3, the stillwell 20 includes a locating cylinder 26 which extends perpendicularly from the stillwell at its lower end and to which there is swaged an end sleeve 27 having a lengthwise axis shown by a line identified by the number 29. In the present invention, the transducer assembly 18 is positioned inside the locating cylinder 26 such that the transducer extends into the stillwell. Furthermore, the wire bus 22 is located inside a guide conduit 28 which is connected to the end of the end sleeve 27 by a connector to be described later.

As shown more clearly in FIG. 4, the guide conduit 28 is connected to the tank sidewall 12 by a coupling assembly indicated at 30. In turn, the wire bus 22 extends through the sidewall 12 at an opening 31 in the sidewall where it terminates at a male sensor connector 34 which is located outside the tank. Attached to the sensor connector 34 is a female fitting 35 (FIG. 2) having wires 36 which lead to the fuel quantity indicator system (not shown).

In the present invention when it is necessary to change the transducer and/or wire bus, the liquid inside the tank is lowered to a level below the sidewall opening 31 (FIG. 4). Following this, a retaining connector 37 is unscrewed from the coupling assembly 30 to uncover sensor connector 34. The transducer assembly 18 and wire bus 22 are then removed from the tank by simply engaging the wire bus at a location outside of the tank and pulling the wire bus and attached transducer assembly out of the locator cylinder 26 and through the conduit 28. Once the repair has been completed, the transducer assembly is re-inserted into the conduit and pushed through the guide conduit 28 by means of the attached wire bus 22 until the transducer assembly is positioned within the stillwell 20 as shown in FIG. 4.

Having provided the above overview, attention now will be turned to additional details of the present invention. Referring now to FIG. 3, the transducer assembly 18 includes a transducer housing having a lengthwise axis shown by a line identified by the number 33a and a crosswise axis shown by a line identified by the number 33b. As shown in FIG. 3, the transducer assembly has a forward end plate section 36 and a rearward tail section 38. The forward endplate includes a flat upper surface having located thereon an ultrasonic transducer 40 which is mounted flush with the flat upper surface. In order to properly guide the transducer assembly within the conduit 28, the tail section 38 of the transducer housing has a cylindrical portion 44 which corresponds to the cylindrical configuration of the conduit.

Furthermore, in order to guide the transducer housing into the stillwell, the inner surface of the stillwell locating cylinder 26 includes a pair of opposing guide slots 46 which are parallel to the lengthwise axis 29. Extending outward from the cylindrical portion 44 are a pair of guide splines 48 which extend lengthwise along the cylindrical portion 44 (parallel to the lengthwise axis 33a) and which are sized to fit within the guide slots 46 of the stillwell locating cylinder. Furthermore, a locator fitting 50 (FIG. 4), formed by parallel upper and lower lips, is attached to the inner surface of the stillwell wall opposite the locating cylinder. The locator fitting 50 receives a forward edge of the transducer housing therein and supports the transducer in the proper orientation within the stillwell.

In this manner, when the transducer assembly is being re-installed in the stillwell, the transducer housing is fed through the guide conduit 28 until the guide splines 48 (FIG. 3) reach the outer end of the locating cylinder 26. In an exemplary embodiment, the radial dimension of the guide splines are oversized with respect to the inner radius of the sleeve and undersized with respect to a sum equal to the inner radius of the sleeve plus the radial dimension (depth) of the guide slots. In this manner, entry of the transducer housing into the sleeve is prevented unless the guide splines are aligned with the guide slots. To accomplish this installation, the transducer housing is rotated a proper amount by rotation of the wire bus 22, until the guide splines align with the guide slots, wherein the transducer housing is fed the remaining distance into the stillwell.

In order to permit the transducer assembly to be properly fed through the conduit 28 and into the locating cylinder 26, the wire bus 22 includes an outer flexible plastic sheath which is sufficiently rigid to allow an operator to push the transducer assembly and wire bus through the conduit from a location outside the tank, but yet is sufficiently flexible to permit the wire bus to conform to any bends in the guide conduit.

The transducer housing is secured within the stillwell by upper, lower retainer balls 56 (FIG. 3) which are mounted within upper, lower openings 58 in the sidewalls of the sleeve 27 and locating cylinder 26. The retainer balls extend slightly radially inward from the inner sidewalls of the locating cylinder where they engage upper, lower slots 60 which extend across the cylindrical portion 44 of the transducer housing parallel to the crosswise axis 33b. The retainer balls 56 are biased into the slots 60 by upper, lower springs 62 which in turn are held in place by upper, lower tabs 64 which are rigidly mounted to the sleeve sidewalls. When removing the transducer assembly from the tank, a slight tug on the wire bus is sufficient to dislodge the transducer housing from the spring biased retainer balls.

As shown more clearly in FIG. 3, the conduit 28 is attached to the stillwell sleeve 27 by a conventional connector 68 such as a flexible coupling (an exemplary embodiment being a flexible coupling identified as SAE Aerospace Standard AS 1712) which clamps together flanged ends 70, 72 (FIG. 4) located at the opposing ends of the sleeve and conduit respectively.

Figure 2:
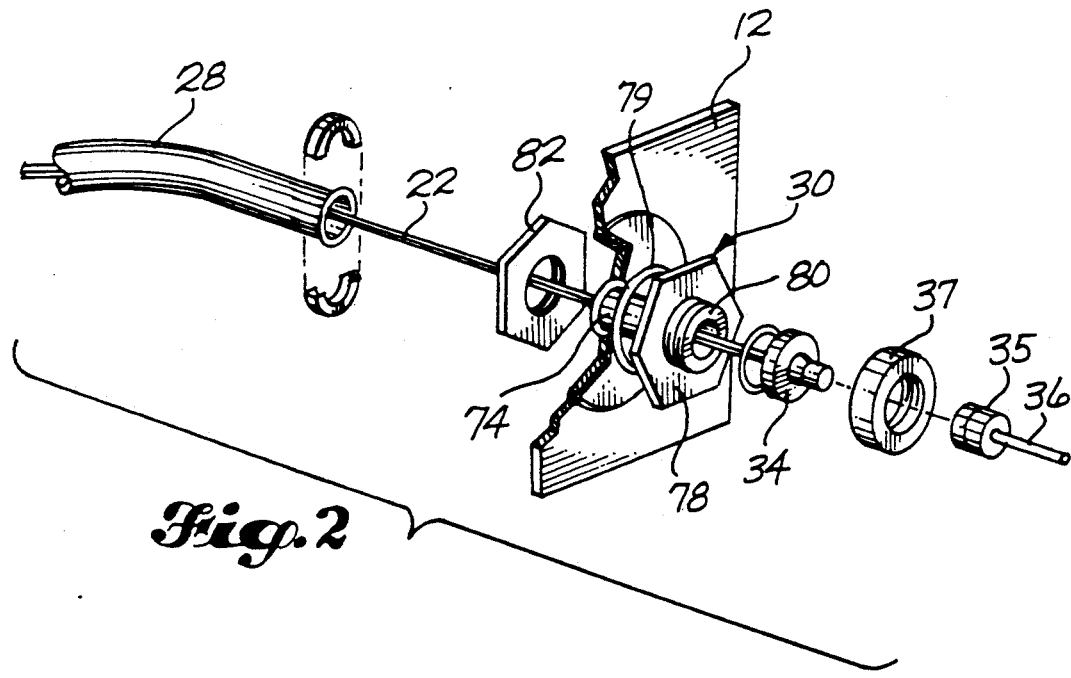
FIG. 2 is an exploded view of an coupling connector portion of the liquid level sensor system.

As mentioned previously, the conduit 28 is connected to the tank sidewall 12 by a connector assembly 30 which is best shown in FIGS. 2 and 4. The connector assembly 30 includes a central cylindrical portion 74 which fits within the opening 31 in the tank sidewall and which includes an integral sleeve 76 which extends leftward inside the tank. Extending from the right side of the central portion 74 is an integral flanged end 78 which engages the outer surface of the tank sidewall 12 by means of an 0-ring 79. In addition, extending axially rightward from the flange 78 is a threaded cylindrical portion 80 upon which the retainer ring 37 is threadably connected. In order to secure the connector assembly 30 to the tank sidewall, a lock nut 82 is fastened to a threaded part of the central portion 74 so that the lock nut 82 engages the inner sidewall of the tank.

Additionally, the right end of the guide conduit 28 is secured to the connector sleeve 76 by a conventional connector 86 which engages opposing flanged ends of the sleeve and conduit.

What is claimed is:

1. A matter level sensor system for a holding tank comprising:
  a. a stillwell;
  b. a transducer assembly, positioned inside the stillwell, for generating a signal which is a function of the level of matter inside the tank, the transducer assembly having a body with a spline extending from the body;
  c. a wire assembly for conducting the signal from the transducer assembly to a location outside the tank, the wire assembly including at least one wire which extends through a wall of the tank;
  d. a sleeve which extends from the stillwell for receiving the transducer assembly therein, the sleeve including at least one slot for receiving the transducer assembly spline therein so as to position the transducer assembly in a predetermined manner inside the sleeve and the stillwell;
  e. a conduit for guiding the transducer assembly to the sleeve, the conduit being connected to the sleeve and extending through the tank wall; and
  f. an end cap which is attached to the conduit at a location outside the tank and which is removable from the conduit to permit installation and removal of the wire assembly and transducer assembly through the conduit.

2. The sensor system as set forth in claim 1 wherein:

a. the transducer assembly includes two splines which extend in a direction parallel to a lengthwise axis of the transducer assembly body; and
b. the sleeve includes two slots which extend in a direction parallel to a lengthwise axis of the sleeve for receiving the transducer assembly splines therein so as to position the transducer in a predetermined manner inside the sleeve and the stillwell and to prevent rotational movement of the transducer assembly body about its lengthwise axis.

3. The sensor system as set forth in claim 1 wherein:
a. the transducer assembly body includes at least one slot therein which extends in a direction parallel to a crosswise axis of the transducer assembly; and
b. the sleeve includes a least one movable element which extends into the transducer assembly slot so as to position the transducer assembly in a predetermined manner inside the sleeve and the stillwell and so as to prevent movement of the transducer assembly in a direction parallel to a lengthwise axis of the transducer assembly body.

4. The sensor system as set forth in claim 1 wherein the matter is a liquid.

5. The sensor system as set forth in claim 1 wherein the spline has a radial dimension which is larger than an inner radius of the sleeve and smaller than a radius equal to a sum of the inner radius of the sleeve plus a radial dimension of the guide slot in order to prevent entry of the transducer body into the sleeve until the spline is aligned with the guide slot.

6. A method of installing a matter level sensor inside a holding tank, the method comprising the steps of:
a. providing a stillwell;
b. providing a sleeve which extends from the stillwell and which has at least one slot;
c. providing a transducer assembly, having a body with a spline extending from the body, for generating a signal which is a function of the level of matter inside the tank;
d. connecting a wire assembly to the transducer assembly for conducting the signal from the transducer assembly to a location outside the tank;
e. connecting a conduit between the sleeve and an opening in a wall of the tank;
f. inserting the transducer assembly and wire assembly through the hole and into the conduit from a location outside of the tank;
g. guiding the transducer assembly through the conduit into the sleeve and the stillwell by pushing the wire assembly through the conduit at a location outside of the tank; and
h. rotating the wire assembly so as to rotate the transducer assembly in a manner to align the spline with the slot so as to position the transducer assembly in a predetermined manner inside the sleeve.

7. The method as set forth in claim 6 wherein the transducer assembly providing step includes a step of providing a transducer assembly having a spline which extends radially from the body of the transducer assembly and which has a radial dimension which is larger than an inner radial dimension of the sleeve and smaller than a radial dimension equal to a sum of the inner radial dimension of the sleeve plus a radial dimension of the guide slots in order to prevent entry of the transducer assembly into the sleeve until the guide splines are aligned with the guide slots.

* * * * *